HENRIETTA H. COLE.

Improvement in Fluting-Machines.

No. 4,349. Reissued April 25, 1871.

Witnesses.

Harry King.

Phil. T. Dodge

Inventor.

H. H. Cole by Dodge & Munn

Her attys.

AM. PHOTO-LITHOGRAPHIC CO. N.Y. (OSBORNES PROCESS.)

UNITED STATES PATENT OFFICE.

HENRIETTA H. COLE, OF NEW YORK, N. Y.

IMPROVEMENT IN FLUTING-MACHINES.

Specification forming part of Letters Patent No. 55,469, dated June 12, 1866; Reissue No. 4,349, dated April 25, 1871.

*To all whom it may concern:*

Be it known that I, HENRIETTA H. COLE, of the city of New York, in the county of New York and State of New York, have invented certain new and useful Improvements in Fluting-Machines; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to fluting-machines; and it consists in so arranging the two fluted rollers between which the material to be fluted is passed that the pressure of the rollers can be immediately released and the rollers separated by interposed elastic mechanism, in order to allow the material being fluted to be removed at any point of its length.

It further consists in such an arrangement of the parts of the machine that the pressure of the rollers upon the material being fluted can be adjusted at pleasure, so as to produce a greater or less amount of pressure, as desired.

It further consists in such an arrangement of the rollers that they can be easily detached from their bearings and other rollers, having larger or smaller corrugations, substituted when desired.

Figure 1:
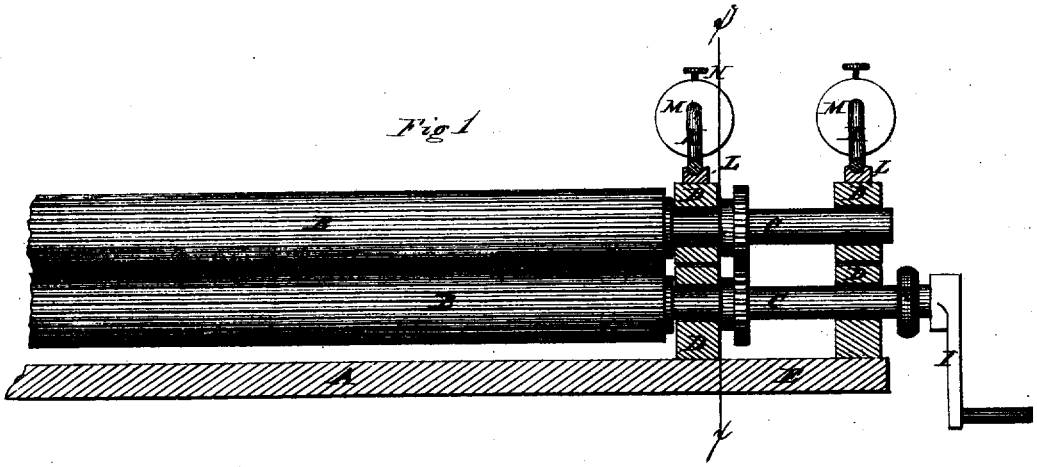
Figure 2:
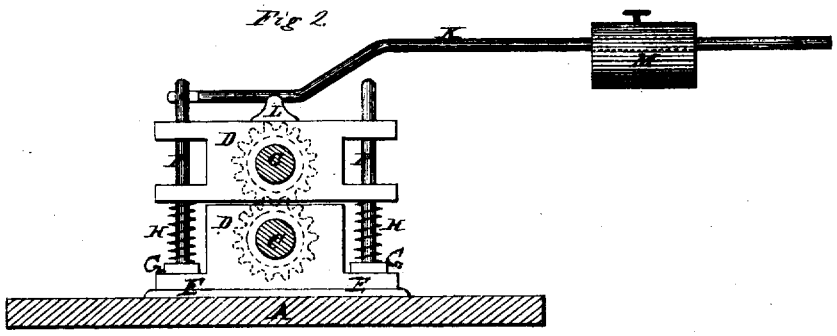

In the drawings, Figure 1 is a side elevation of the machine, partly in section; and Fig. 2 is a transverse vertical section on the line *x x* of Fig. 1.

A represents the bed-plate of the machine, and F upright guide-posts rigidly connected to this bed-plate at its end E. Upon these guide-posts are arranged two sets of journal-boxes, D D, each set being arranged as shown in Fig. 2, with spiral springs H or other suitable elastic mechanism interposed between them, as shown in the same figure. The upper boxes move loosely on the guide-posts, and the lower or under ones may be securely fastened, so as to be stationary, by means of nuts C′. In these journal-boxes hollow rollers B, fluted longitudinally and similarly, and provided at one end with journals C, are mounted by inserting these journals through the journal-boxes. When in position their lateral movement may, if desired or necessary, be prevented by the use of any suitable mechanical device. They can also be easily detached when it is desired to use rollers having larger or smaller corrugations in their stead.

To the upper end of the guide-posts F, on the same side of the machine, a lever-arm, K, is pivoted, so as to extend over and bear upon a block, L, or other projection upon the upper side of the upper journal-box. This arm K has a weight, M, arranged to slide loosely upon it and to be secured in any desired position by means of a set-screw, in order that it may be adjusted to give any required pressure.

In order to operate the machine thus constructed, the outer end of the journal of one of the rollers is provided with a crank-handle, I. The method of its operation is as follows: After the rollers are attached they are heated, if desired, by the insertion of hot irons in the ordinary way, and are brought and held together by means of the weighted levers, with their weights arranged to give the desired pressure. They are then revolved by means of the crank I, their corrugations gearing into each other, causing the roller revolved by the crank to turn its mate. The material to be fluted is then fed between them, and should it be desired to remove this material at any point in its length, or to leave a space and then commence fluting again, it is only necessary to raise the levers, when the springs interposed between the journal-boxes will at once separate the rollers and permit the material to be removed or adjusted, as required.

Having thus described my invention, what I claim is—

1. A fluting-machine having the journal-boxes of one of its rollers stationary and those of the other movable, with elastic mechanism interposed between the boxes, and with an adjustable and removable pressure on the outer side of the movable box, substantially as herein described.

2. In a fluting-machine, the combination of the fluted rollers with elastic mechanism, when constructed and arranged to operate as herein described, for the purpose of separating the rollers on the removal of the pressure, as set forth.

3. In combination with the fluted rollers, operated substantially as herein described, the weighted lever K, for applying the pressure, whether the weight thereon be adjustable or stationary.

4. The arrangement of the fluting-rollers B, as herein described, in order that they may be detached and others provided with larger or smaller corrugations substituted, as set forth.

HENRIETTA H. COLE.

Witnesses:
H. B. MUNN,
PHIL. T. DODGE.